US006827199B1

(12) United States Patent
Amendolea

(10) Patent No.: US 6,827,199 B1
(45) Date of Patent: Dec. 7, 2004

(54) ARTICLE TRANSPORTING AND ESCAPEMENT DEVICE

(75) Inventor: Richard M. Amendolea, 4546 Quaker Ct., Canfield, OH (US) 44406

(73) Assignee: Richard M. Amendolea, Ganfield, OH (US)

(*) Notice: Subject to any disclaimer, the term of this patent is extended or adjusted under 35 U.S.C. 154(b) by 822 days.

(21) Appl. No.: 09/165,272

(22) Filed: Oct. 1, 1998

Related U.S. Application Data

(60) Provisional application No. 60/060,642, filed on Oct. 1, 1997.

(51) Int. Cl.[7] .............................................. B65G 47/26
(52) U.S. Cl. ................................ 198/459.7; 198/419.1; 198/463.6; 209/659; 209/619; 209/911; 209/924
(58) Field of Search ........................... 198/463.6, 459.7, 198/419.1, 345.1; 209/659, 619, 606, 924, 911

(56) References Cited

U.S. PATENT DOCUMENTS

| | | | |
|---|---|---|---|
| 1,185,356 A | 5/1916 | Weaver | |
| 1,837,607 A | * 12/1931 | Biggert, Jr. | 198/419.1 |
| 2,611,911 A | 9/1952 | Graham et al. | 10/162 |
| 2,712,398 A | 7/1955 | Erdmann | 221/220 |
| 2,930,510 A | 3/1960 | Pallissard | 221/289 |
| 2,937,788 A | 5/1960 | Darsie | 221/298 |
| 2,973,108 A | 2/1961 | Gable | 214/8 |
| 3,133,670 A | * 5/1964 | Heyer | 198/419.1 |
| 3,240,356 A | 3/1966 | Hill | 214/1 |
| 3,248,005 A | * 4/1966 | Joschko | 221/13 |
| 3,379,346 A | 4/1968 | Frederick et al. | 221/224 |
| 3,796,324 A | 3/1974 | Schmitz | 214/8.5 |
| 3,799,395 A | 3/1974 | Vanderpool | 221/289 |
| 3,827,582 A | * 8/1974 | Lederer | 198/419.1 |
| 3,946,884 A | 3/1976 | Kato et al. | 214/1 |
| 4,040,513 A | 8/1977 | Walls | 198/530 |
| 4,274,782 A | 6/1981 | de Rancourt de Mimerand et al. | 414/104 |
| 4,393,981 A | 7/1983 | Wada et al. | 221/289 |
| 4,494,644 A | 1/1985 | Rizzo, Sr. | 198/409 |
| 4,589,811 A | * 5/1986 | Riccardo et al. | 198/463.6 |
| 4,609,319 A | 9/1986 | Campisi et al. | 414/224 |
| 4,667,602 A | * 5/1987 | Vaida et al. | 198/463.6 |
| 4,688,697 A | 8/1987 | Ballard | 221/298 |
| 4,733,459 A | * 3/1988 | Tateno | 198/463.6 |
| 4,754,866 A | 7/1988 | Billington et al. | 198/451 |
| 4,874,080 A | 10/1989 | Wroblewski | 198/463.6 |
| 4,995,531 A | * 2/1991 | Summers | 221/75 |
| 5,064,050 A | 11/1991 | Stadler | 198/459 |
| 5,086,921 A | * 2/1992 | Neff | 206/338 |
| 5,154,277 A | 10/1992 | Murakami | 198/463.6 |
| 5,238,116 A | 8/1993 | Santicchi | 209/3.3 |
| 5,259,723 A | 11/1993 | Willis et al. | 414/746.4 |
| 5,372,279 A | 12/1994 | Aoyama | 221/251 |
| 6,079,547 A | * 6/2000 | Takada | 198/459.7 |

FOREIGN PATENT DOCUMENTS

DE          3934961         4/1991

* cited by examiner

*Primary Examiner*—Douglas Hess
(74) *Attorney, Agent, or Firm*—Webb Ziesenheim Logsdon Orkin & Hanson, P.C.

(57) ABSTRACT

A transporting and escapement device includes an internal guide member extending along the conveying path and extending through an aperture in each conveyed article. The guide member will serve to guide the article along the conveying path. The guide member is supported by at least one escapement assembly. Each escapement assembly includes at least two independently operated guide member engaging supports which can selectively engage the guide member at spaced locations along the guide member. At least one support of at least one escapement assembly will be engaged with the guide member at any given time.

40 Claims, 12 Drawing Sheets

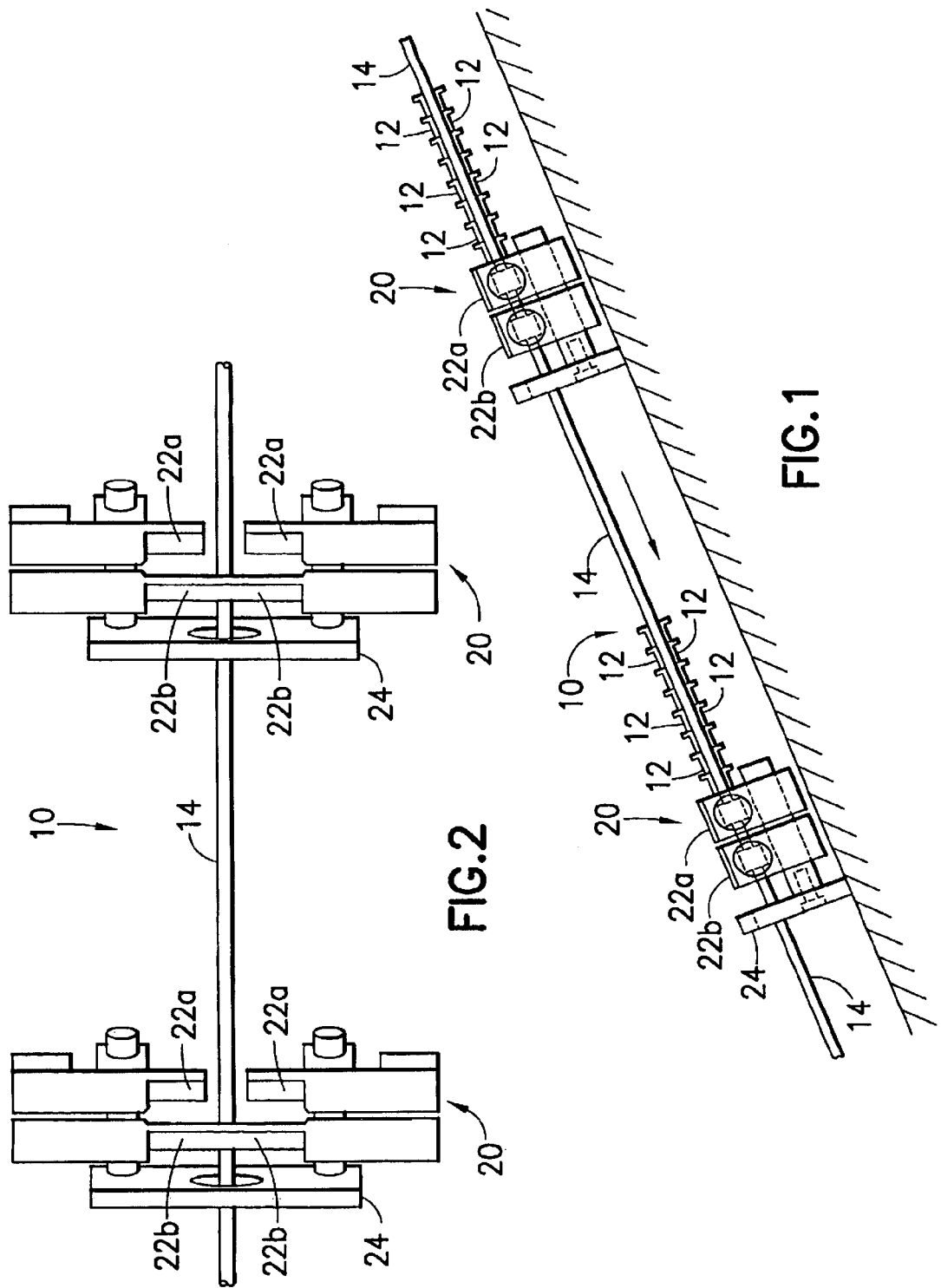

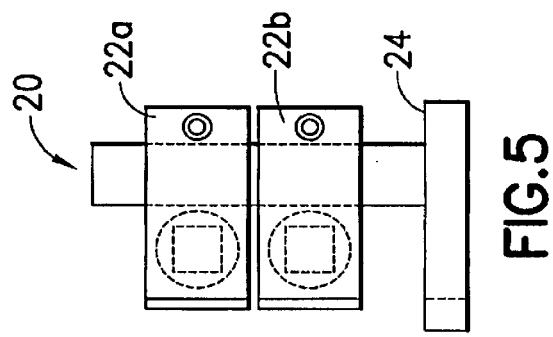
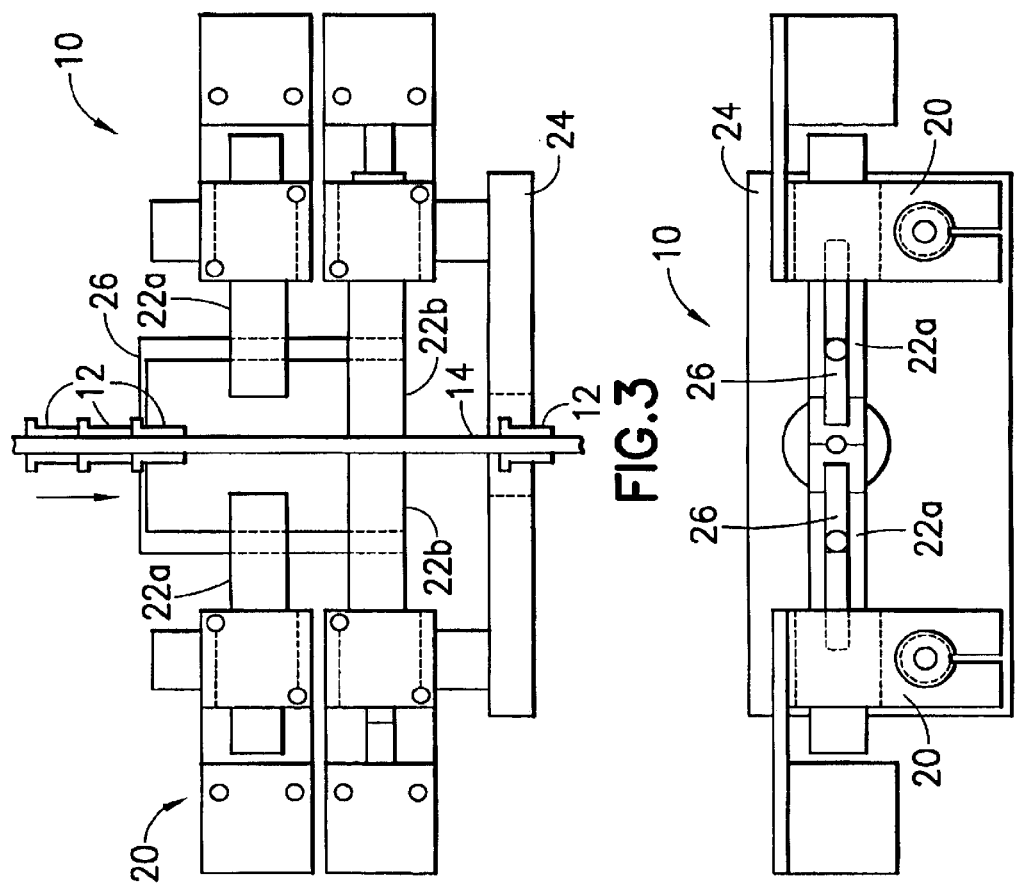

SEQUENCE NO.1

SEQUENCE NO.2

SEQUENCE NO.3

SEQUENCE NO.4

SEQUENCE NO.5

SEQUENCE NO.6

SEQUENCE NO.7

SEQUENCE NO.8

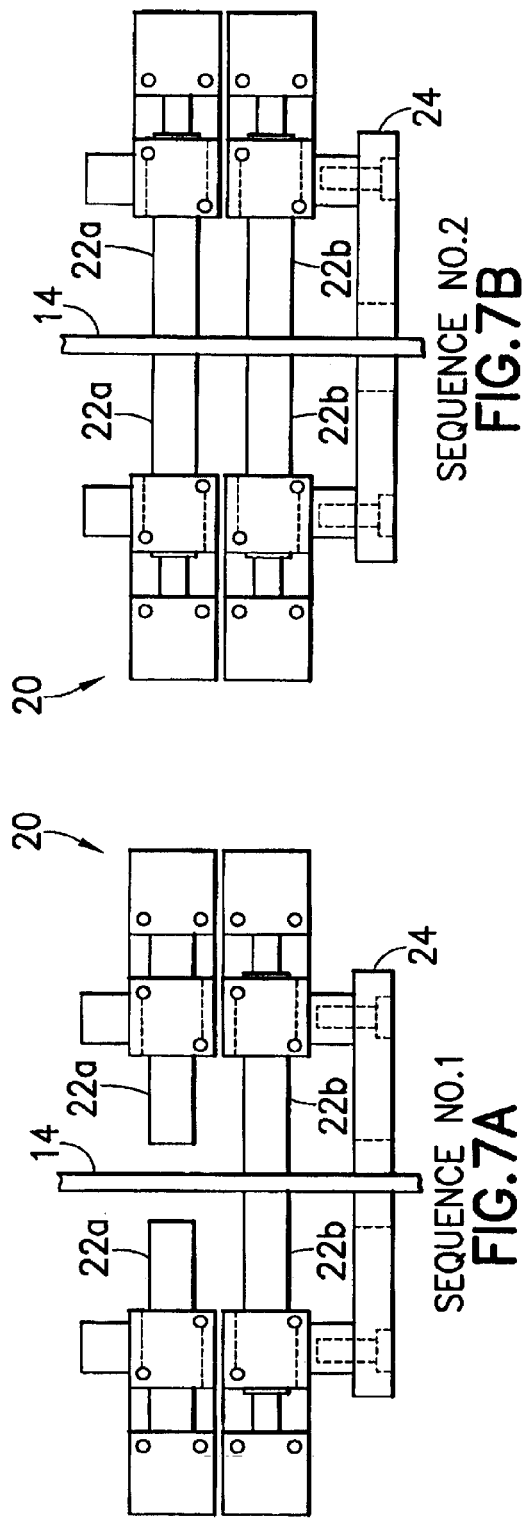

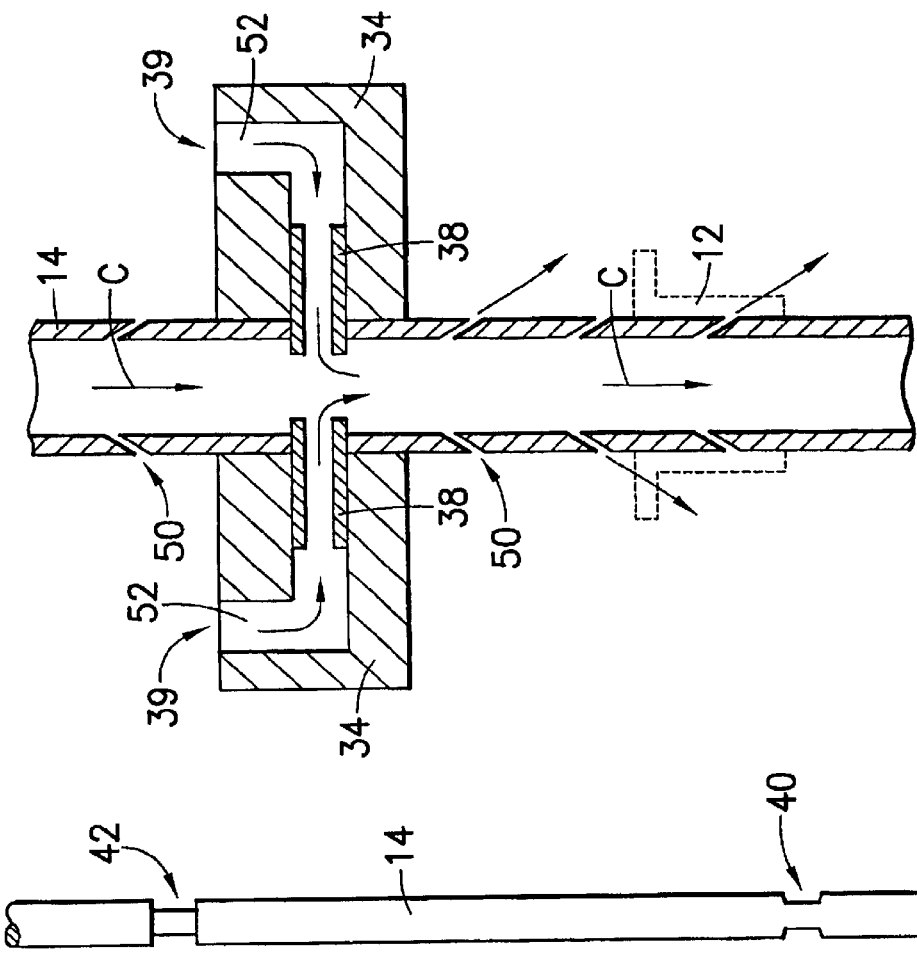
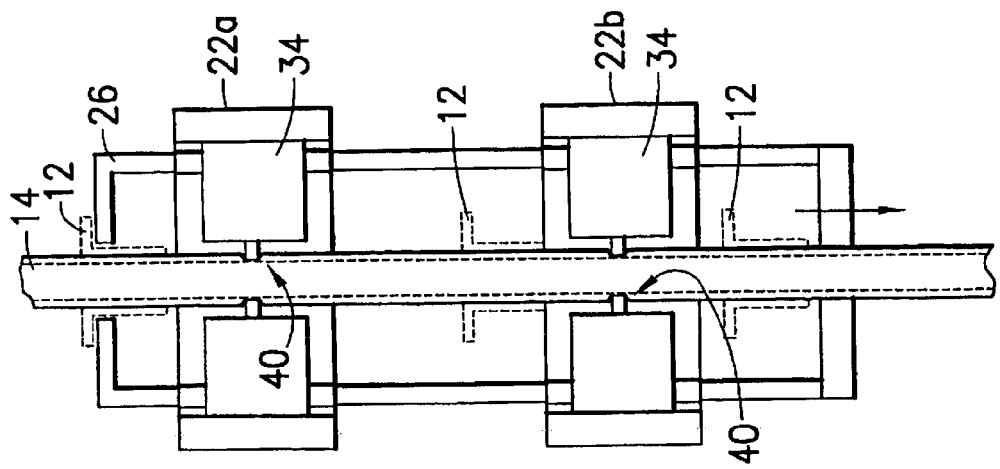

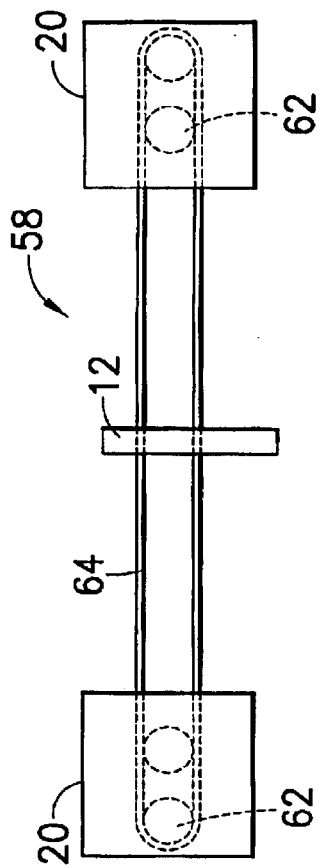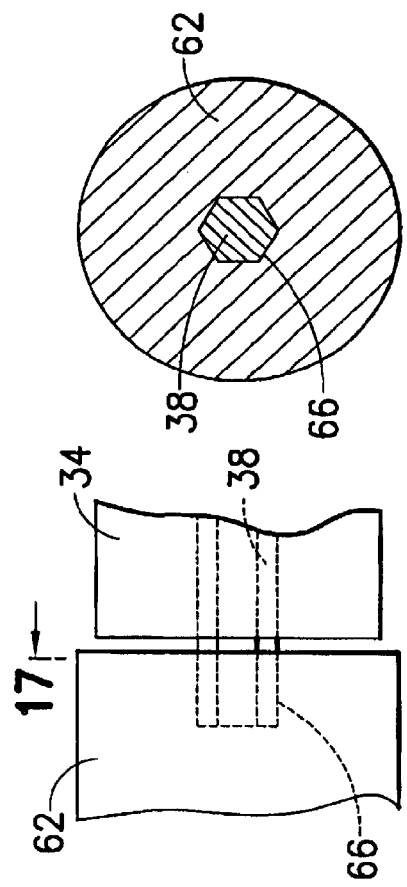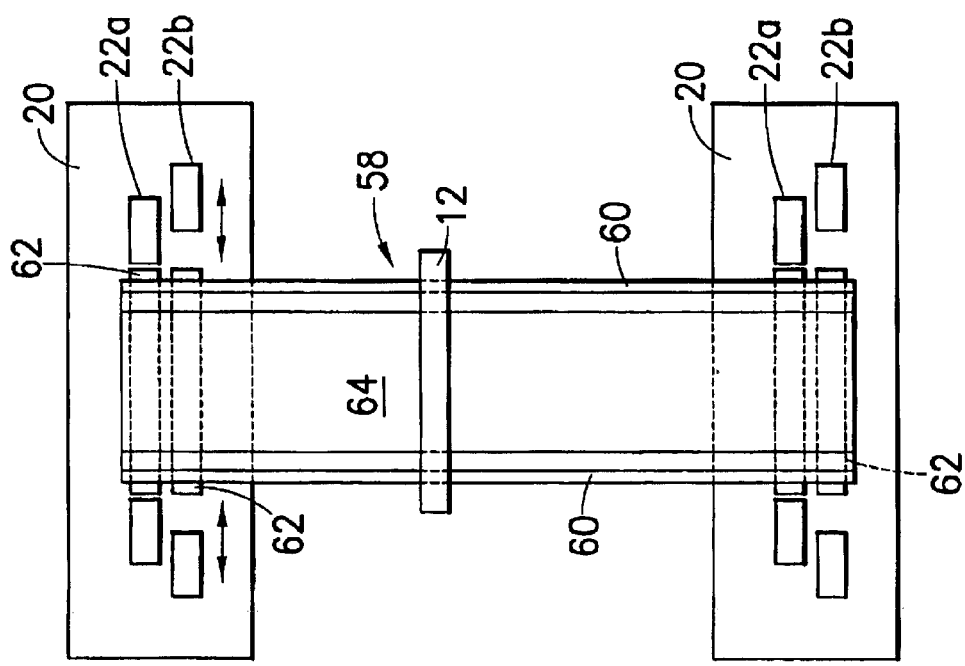

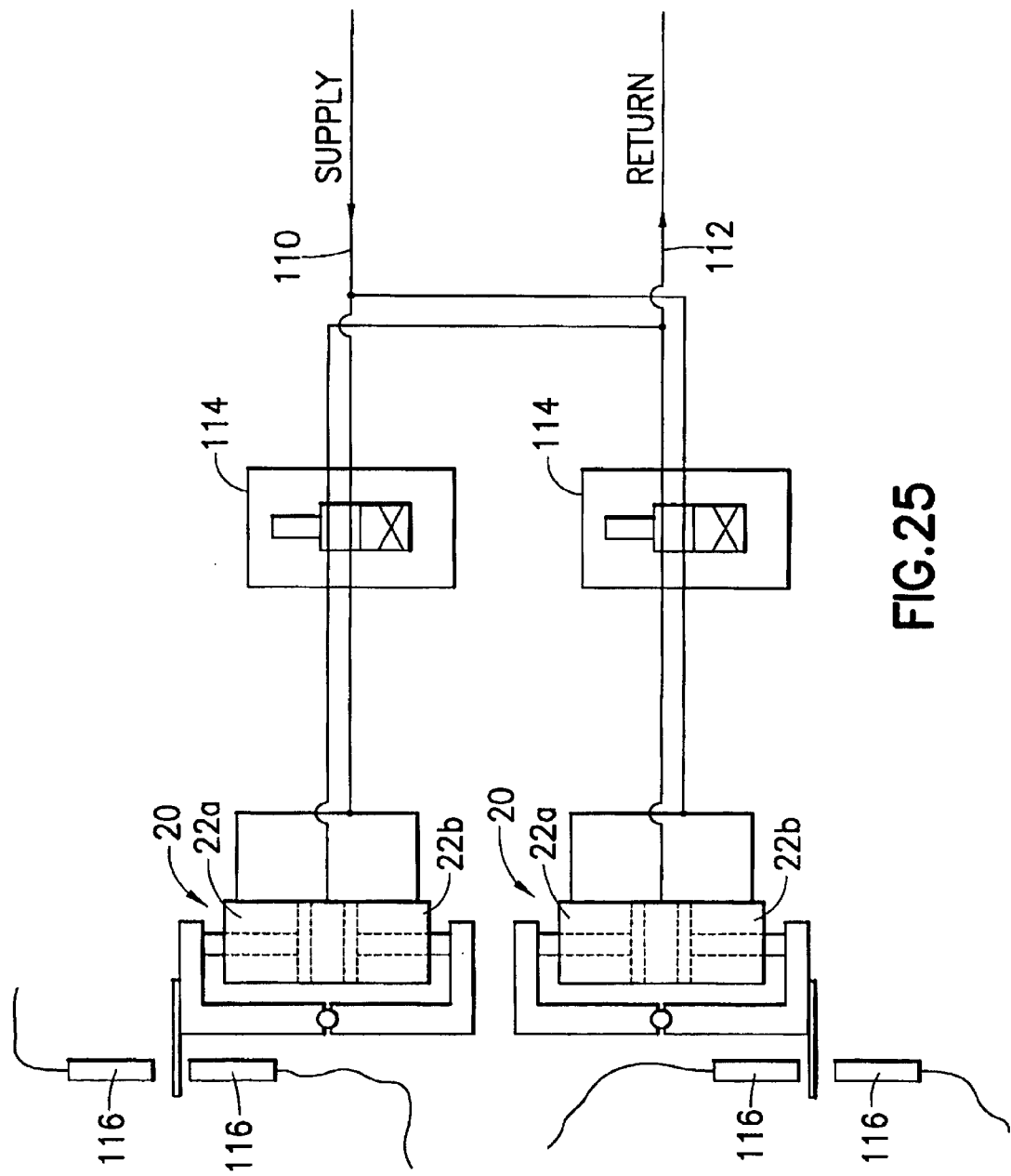

ARTICLE TRANSPORTING AND ESCAPEMENT DEVICE

This application claims the benefit of United States Provisional Patent Application Serial No. 60/060,642, filed Oct. 1, 1997, entitled "Article Transporting and Escapement Device", which is incorporated hereinafter by reference.

BACKGROUND OF THE INVENTION

1. Field of the Invention

I, Richard M. Amendolea, have invented improvements relating to article handling, and more specifically, to an article transporting and escapement device for articles having at least one aperture, or the like, therethrough.

2. Description of the Prior Art

Escapement devices have long been used for transporting articles in a controlled manner along a conveying path. Escapement devices typically allow a, predetermined number of articles to be advanced along the conveying path at specific intervals. Escapement devices are commonly used for packaging and controlled delivery of articles to be assembled or selectively worked upon. Essentially, escapement devices are appropriate for any application where continuous controlled delivery of articles is desired. The conveying path is generally formed as a support member which supports an external surface of the workpiece, such as a chute, a conveyor belt, a vibratory plate or the like.

A conventional escapement device includes first and second article stopping mechanisms spaced a set distance apart along the support member defining the conveying path. The first article stopping member will be positioned to engage a leading article along the conveying path to prevent all of the articles following the leading article from being advanced along the conveying path. The second article stopping member will then engage one of the articles along the conveying path spaced a predetermined number of articles from the positioning of the first stopping mechanism. The second stopping mechanism will also prevent all of the articles rearward from its point of engagement from being advanced along the conveying path. The first stopping mechanism is then released allowing a predetermined number of articles up to the engagement point of the second stopping mechanism, to be advanced along the conveying path. Following the conveying of the predetermined number of articles, the first stopping member is again positioned for engagement with the articles to be moved along the conveying path. The second stopping mechanism is then released allowing the article to be advanced until the lead article engages with the first stopping mechanism thereby allowing the conveying process to be repeated. The advancement of the articles along the conveying path may be by gravity feed, vibratory feeder, conveyor belt, air assist, or any known system.

A difficulty exists with current escapement devices operating with apertured articles, such as annular workpieces, where the exterior of the article needs to be accessible, such as for painting, inspecting or other subsequent processing. For example, in many automated assembly operations the assembly device is designed to grip the entire external surface of the article such that a separate article handling device is used to feed the article from the escapement device to the assembly device. In these situations, the separate article handling device is employed to individually grip and orientate the interior of the article to expose the exterior surface thereof. This design of escapement devices results in increased handling time and increased number of article handling components.

An object of my invention is to overcome the aforementioned drawbacks of the prior art and to provide a transporting and escapement device for apertured articles which will support the articles from the interior thereof for transportation along a conveying path. A further object of my invention is to provide an escapement device which is flexible and cost-effective in design. Another object of my invention is to provide a transporting and escapement device which forms an efficient conveying system for articles.

SUMMARY OF THE INVENTION

The above objects are achieved with a transporting and escapement device according to my invention. The transporting and escapement device of my invention includes an internal guide member extending along the conveying path and extending through an aperture, or the like, in each article. The guide member will serve to guide the article along the conveying path. The guide member is supported by at least one escapement assembly. Each escapement assembly includes at least two independently operated guide member engaging supports which can selectively engage the guide member at spaced locations along the guide member. At least one support of at least one escapement assembly will be engaged with the guide member at any given time.

The guide member engaging supports structurally support the guide member and may be used to isolate one or more articles for selective transportation along the guide member in a manner analogous to existing escapement devices. For example, to begin a feeding sequence, a leading article may be resting against a first support which is engaged with and supports the guide member. A second support is moved into engagement with the guide member at a spaced location from the first support and will also serve to support the guide member. The second support will also engage an article along the conveying path a predetermined number of articles behind the leading article. The second support may include a distinct separating member for engaging with the articles. The provision of the distinct separating member allows the second support to engage the guide member farther down the guide member along the conveying path than the position of first support is engagement with the guide member. The first support is withdrawn from engagement with the guide member allowing the predetermined number of articles to be advanced along the guide member. Following the advancement of the articles, the first support is again engaged with the guide member. The second support is released from engagement with the guide member allowing the remaining articles to advance along the guide member to the first support with a new leading article. The process can then be repeated as needed with the guide member being continuously supported throughout the process. The advancement of the articles along the guide member may be by gravity feed, vibratory feeder-conveyor belt, air assist, or any known advancement system of combination thereof. Additionally, the guide member may include a powered driving member, such as drive rollers, wheels or a conveyor belt. The power supply for the powered guide member may be built into the guide member, such as a battery. Alternatively, the power supply for the guide member may be through the supports, such as an electrical, pneumatic or hydraulic connection or a mechanical drive connection.

The guide member may also be formed as a hollow or tubular member. The interior of the hollow guide member may be filled with a hot or cold fluid medium which can be used for efficient temperature control of the articles. The hollow guide member could alternatively have holes extending in the direction of article travel to the exterior of the guide member. Compressed air, or the like, may then be used in the hollow interior to advance the articles. The compressed air would exit the hollow interior through the holes and thereby advance the articles.

My invention has particular application as an extended conveying system for articles. The guide member may be extended along the desired path of the product. In an extended conveying system, at least two escapement assemblies would support the extended guide member at spaced locations along the guide member. Essentially, an escapement assembly would be positioned where a guide member support is desired, or where the escapement capabilities (i.e., controlled delivery) is desired, or where both are desired. It is also anticipated that the guide member of the present invention may be used to orientate the article as needed. For example, the guide member may be formed as an ellipse, square or polygon which matches the shape of the aperture in the workpiece. With such an arrangement, changes in the orientation of the guide member, such as by twisting or rotating of the guide member, may be used to properly orientate the article. Alternatively, two or more generally parallel guide members may be used such that changes in the respective positions of the guide members relative to each other may be used to properly orientate the article. Where more than one guide member is used, each support may be adapted to simultaneously engage all of the guide members. The guide member of my invention may also be used to easily gauge wall thickness of an article and to segregate articles.

These and other advantages of the present invention will be clarified in the following description taken together with the attached figures wherein like elements are identified with like reference numerals throughout.

BRIEF DESCRIPTION OF THE DRAWINGS

FIG. 1 is a side view of an article transporting and escapement device for apertured articles according to my invention;

FIG. 2 is a plan view of the device shown in FIG. 1 with the transported articles removed;

FIG. 3 is a plan view of a modified transporting and escapement device according to the present invention;

FIG. 4 is a rear view of the device shown in FIG. 3;

FIG. 5 is a left side view of the device shown in FIG. 3;

FIGS. 7A–7D are sequential plan views showing the operation of the device shown in FIG. 1;

FIG. 11 is a front view of the guide member engaging support shown in FIG. 10 supporting a guide member;

FIG. 12 is a side view of an exemplary guide member;

FIG. 13 is a schematic sectional view of a pneumatically operated embodiment of the guide member engaging support shown in FIG. 11 in fluid communication with a guide member according to my invention;

FIG. 14 is a schematic plan view showing a guide member in the form of a conveyor;

FIG. 15 is a schematic side view of the conveyor shown in FIG. 14;

FIG. 16 is a schematic side view showing a gripping arm having a hexagonal guide pin engaging a roller of the conveyor belt shown in FIG. 14;

FIG. 17 is a sectional view along sectional line P—P in FIG. 16 showing the hexagonal guide pin received in a mating recess in the roller of the conveyor;

FIG. 25 is a schematic view of a typical pneumatic/hydraulic circuit for a guide member engaging support.

DESCRIPTION OF THE PREFERRED EMBODIMENTS

Figure 6A:
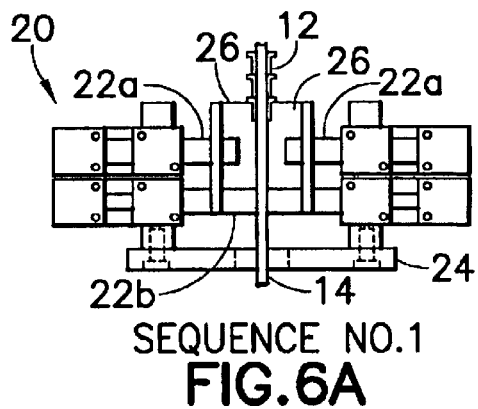
FIGS. 6A–6H are sequential plan views showing the operation of the device shown in FIG. 3.

FIG. 1 illustrates an article transporting and escapement device 10 for annular workpieces 12 according to one embodiment of my invention. The transporting and escapement device 10 includes an internal guide member 14 extending along the conveying path and extending through the center of each workpiece 12. The article transporting and escapement device 10 will operate on any apertured article with the guide member 14 extending through at least one aperture in each article. By apertured article it is meant that the article defines at least one opening therethrough. The outer circumference of the article does not need to be a continuous surface and can include a gap or opening communicating with the aperture, such as open-ring type articles. The article transporting and escapement device 10 can also operate on a non-apertured article, such as a split ring or a clothes hanger, provided that the article can be supported from the guide member 14. The guide member 14 may be used for segregating non-apertured workpieces 12. For example, the guide member 14 may be used gauging the slot in a split ring shaped workpiece. A split ring shaped workpiece forms a C-shape in cross-section with the opposed ends of the "C" forming the slot. By decreasing the diameter of the guide member 14 along its length, the workpiece 12 can be made to fall off of the guide member 14 when the guide member 14 has a diameter equal to the desired slot thickness. If the guide member 14 is formed with a continuously decreasing diameter, there will be a length of guide member 14 associated with an acceptable workpiece of desired slot thickness. If the workpiece 12 falls off of the guide member 14 before this area, the slot is unacceptably wide. If the workpiece 12 does not fall off the guide member 14 by the end of this length, the slot in the workpiece 12 is unacceptably narrow. The workpieces 12 are thereby easily segregated into unacceptable workpieces with slots that are too wide, acceptable workpieces and unacceptable workpieces with slots that are too narrow. However, as evidenced in the following description, my invention has particular advantages for handling apertured articles such as workpieces 12.

The guide member 14 can be easily formed from metal bar stock bent into the shape of the desired conveying path with the bar stock having any cross-section as discussed below. The guide member 14 can also be formed of plastic depending on the particular workpieces 12 and the working environment for the device 10. The guide member 14 will serve to guide the workpiece 12 along the conveying path. The internal guide member 14 may be used together with an external probe (not shown) for gauging the wall thickness of the workpiece 12. This represents a significantly easier process for measuring wall thickness than the machinery needed for measuring wall thickness of annular work pieces carried by prior art transporting devices. The guide member 14 may also be used to rotationally orientate the workpiece 12, as needed. For example, the guide member 14 may be formed as an ellipse, square or polygon which matches the shape of the central opening in the workpiece 12, wherein changes in the orientation of the guide member 14, such as by twisting, will orientate the workpiece 12. Although only a single guide member 14 is illustrated, two or more generally parallel guide members 14 may be used with a workpiece 12 having more than one aperture. With more than one guide member 14, changes in the respective positions of the guide members 14 relative to each other may be used to properly orientate the multi-aperture workpiece 12, for example, rotating workpiece 12 through 180°.

The guide member 14 is supported by a pair of escapement assemblies 20. Each escapement assembly 20 will serve as a support for one end of the guide member 14, as described below. Each escapement assembly 20 includes at least two independently, pneumatically operated guide member engaging supports 22a and 22b which can selectively engage and support the guide member 14 at spaced locations along the guide member 14. Pneumatic power represents a cost-effective example as a power source since most industrial applications already have existing pneumatic power. Any conventional power source may be used, for example, electrical, hydraulic, electromechanical or electromagnetic. Each escapement assembly 20 also includes appropriate controls, discussed hereinafter, for controlling the operation of each support 22a and 22b. The control may be associated with a timing sequence for timed operation of the supports 22a and 22b. Each support 22a and 22b is essentially formed from a pair of pneumatic cylinders on opposite sides of the guide member 14. The supports 22a and 22b are adjustably mounted on posts extending from a base 24 which, in turn, may be mounted in the desired location in the working environment (e.g., a shop floor, wall, etc.). The supports 22a and 22b may be powered by any known power source, such as a pneumatic source, a hydraulic source, linear motors, or any other conventional moving mechanisms. At least one support 22a and 22b of each escapement assembly 20 will be engaged with the guide member 14 at any given time.

The supports 22a and 22b of each escapement assembly 20 may be used to isolate one or more workpieces 12 for selective transportation along the guide member 14 in a manner analogous to existing escapement devices. This operation can be explained in greater detail in connection with the modified article transporting and escapement device 10 for annular workpieces 12 shown in FIGS. 3–5. The article transporting and escapement device 10 is substantially the same as the article transporting and escapement device 10 shown in FIGS. 1–2 except that one of the supports 22b includes a distinct separating member 26 for engaging with the workpiece 12. The support 22b which includes the separating member 26 is the lower support 22b shown in FIG. 3 and referred to as the second support 22b in describing the operation of the escapement assembly 20. The provision of the distinct separating member 26 allows the second support 22b to engage the guide member 14 and the workpiece without using an external or ancillary separating device, as shown in FIG. 3.

Figure 6B:
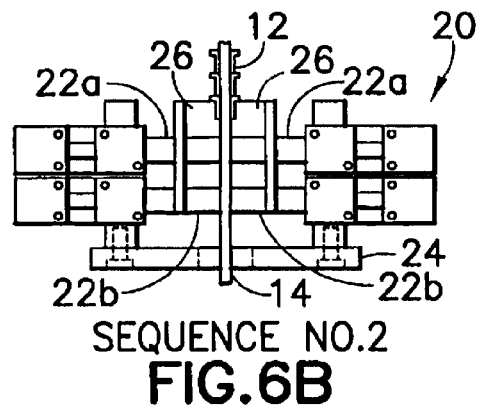
Figure 6C:
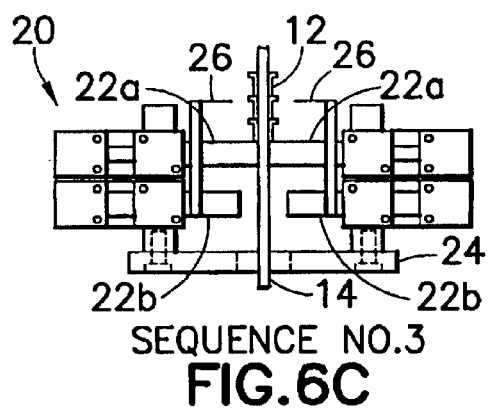
Figure 6D:
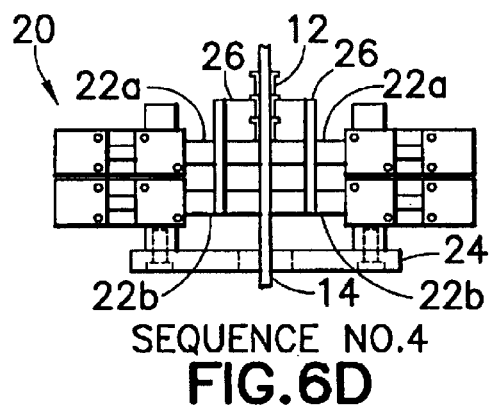
Figure 6E:
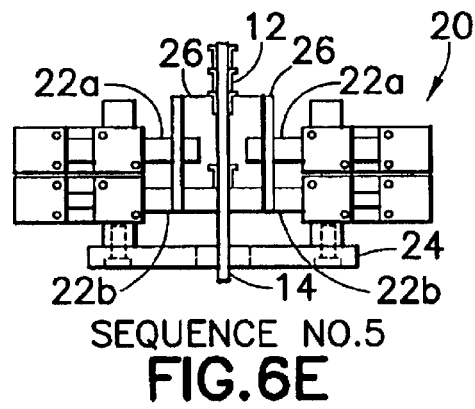
Figure 6F:
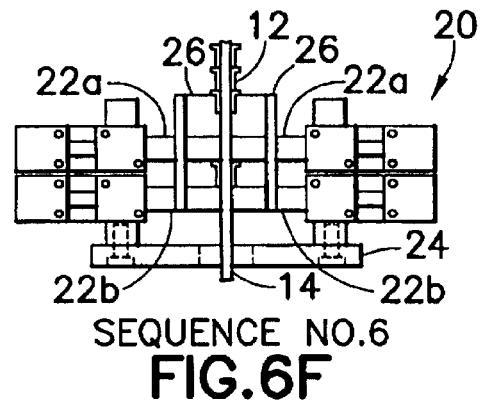
Figure 6G:
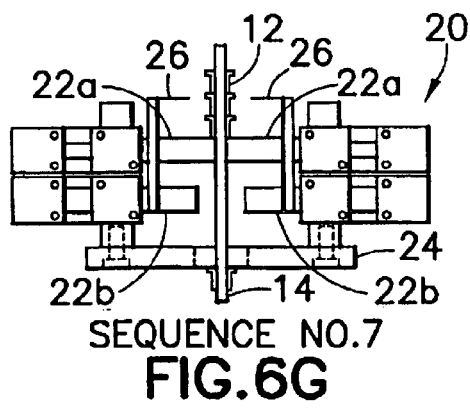
Figure 6H:
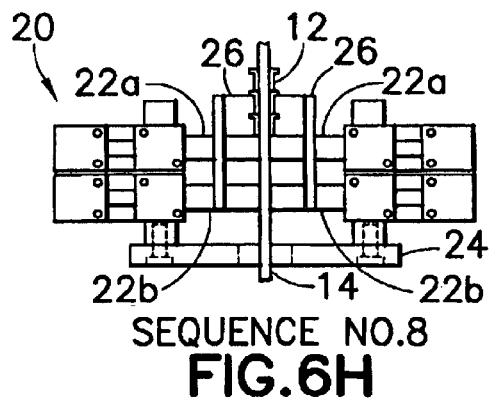

The sequential operation of the article transporting and escapement device 10 is illustrated in FIGS. 6A–6H. Initially, one or both of the supports 22a and 22b will be engaging the guide member 14. FIG. 6A shows one opening operational step where only the second support 22b is engaging the guide member 14. The workpieces 12 are placed onto an upper or leading end of the guide member 14 and advanced along the guide member 14 until a leading workpiece 12 abuts against the separating member 26 as shown in FIG. 6A. The feeding of the workpieces 12 along the guide member 14 may be by gravity feed, as shown in FIG. 1, or by any other conventional feeding system. The first support 22a is then moved into engagement with the guide member 14, as shown in FIG. 6B. The second engaging member 22b is then retracted withdrawing the separating member 26 from engagement with the leading workpiece 12 thereby allowing the workpieces 12 to be advanced along the guide member 14 until the leading workpiece 12 engages against the first support 22a, as shown in FIG. 6C. It should be understood that FIG. 6C also represents an alternative starting position for the process. The second support 22b is then re-engaged with the guide member 14, and the separating member 26 will engage with a workpiece 12 which is a predetermined number of workpieces 12 behind the leading workpiece 12, as shown in FIG. 6D. The predetermined number of workpieces 12 advanced together is shown as one in the figures, however, this may be changed by altering the spacing between the supports 22a and 22b and appropriately spacing the separating member 26. Preferably, the posts on the base 24 and the attachment of the separating member 26 will each have appropriate adjustment capabilities. The first support 22a is then released from engagement with the guide member 14, as shown in FIG. 6E, allowing the predetermined number (1) of workpieces 12 to be advanced along the guide member 14 until the leading workpiece 12 engages the second support 22b. Following the conveying of the predetermined number of workpieces 12 to the second support 22b, the first support 22a is again engaged with the guide member 14, as shown in FIG. 6F. The second support 22b is then released from engagement with the guide member 14 allowing the remaining workpieces 12 to be advanced until a new lead workpiece 12 engages with the first support 22a and the predetermined number of workpieces 12 (1) is allowed to advance beyond both supports 22a and 22b as shown in FIG. 6G. The positioning of the components of the escapement assembly 20 in FIG. 6G is identical to the positioning of the components in FIG. 6C, described above, thereby allowing the conveying process to be repeated. The step shown in FIG. 6H is identical to the step shown in FIG. 6D, with the steps shown in FIGS. 6E–6H being repeated as needed. The guide member 14 is continuously supported throughout the process by at least one support 22a and 22b.

FIGS. 7A–7D show the sequential operation of the supports 22a and 22b of the escapement device 20 illustrated in FIG. 1. The separating member 26 is not present in this embodiment and the workpieces 12 have been removed for clarity. As shown in the sequential drawings, the guide member 14 is always supported by at least one support 22a and 22b. The separating member 26 may be eliminated if another escapement device or other workpiece feeder is positioned farther upstream along the guide member 14. FIGS. 6A–6H and 7A–7D clarify that the essential functions of the supports 22a and 22b are to physically support the guide member 14 to allow the workpieces 12 to be advanced along the guide member 14 and to meter or control the advancement of the workpieces 12 along the conveying path. All three of these functions are interrelated in the design of the supports 22a and 22b, but are distinct aspects of the supports 22a and 22b. With regard to support of the guide member 14, the guide member 14 may include slots or holes therethrough to receive corresponding projections on the respective supports 22a and 22b. This arrangement will prevent the axial slipping of the guide member 14 relative to the supports 22a and 22b and is discussed in greater detail hereinafter.

Figure 8:
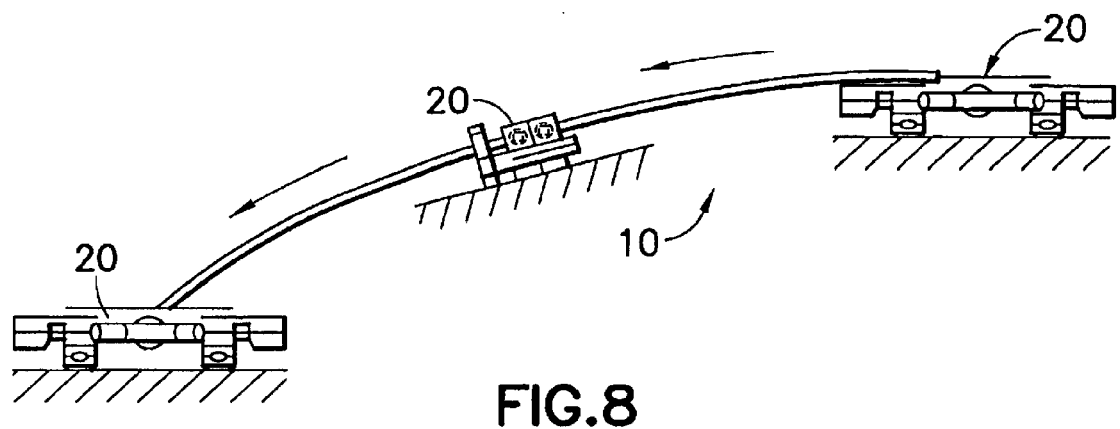
FIG. 8 is a side view of another version of an article transporting and escapement device for articles according to my invention.
Figure 9:
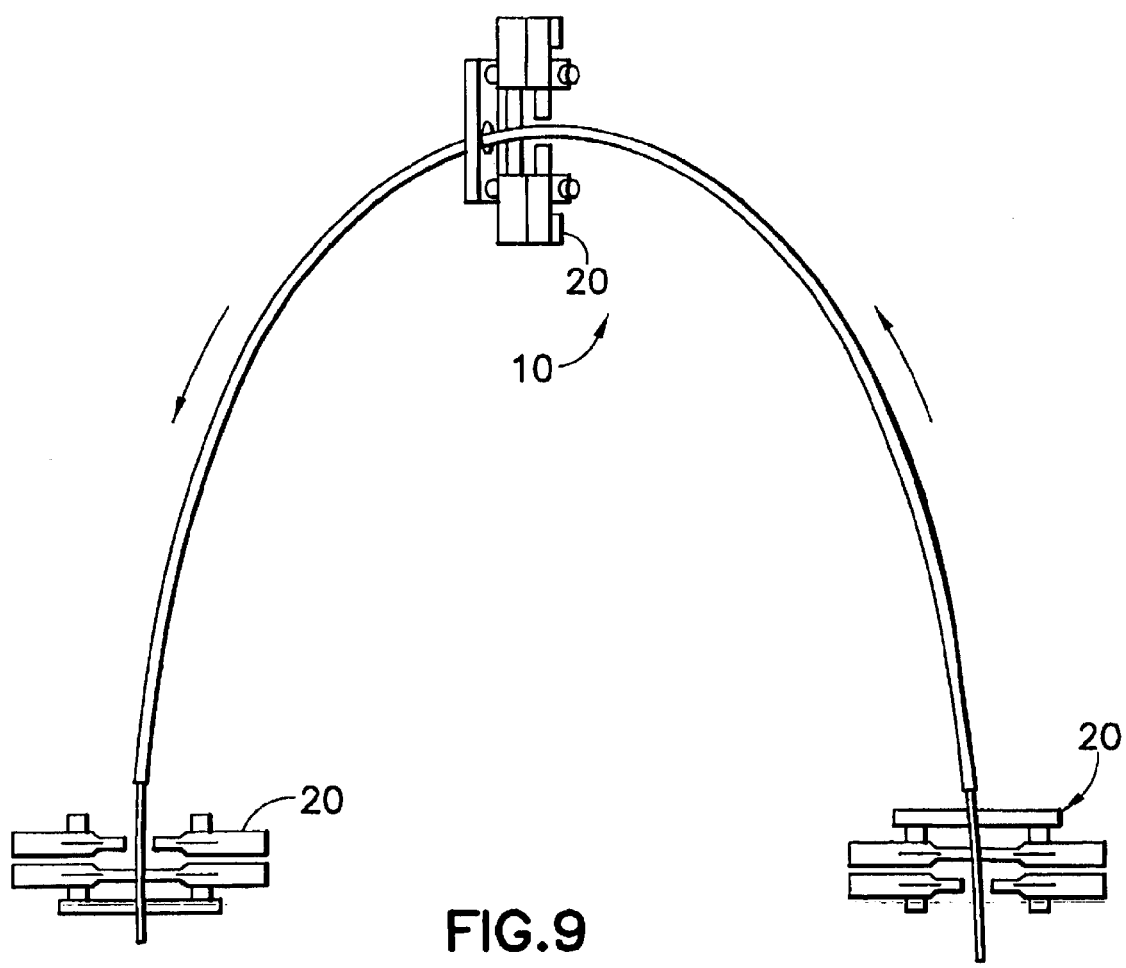
FIG. 9 is a plan view of the device shown in FIG. 8.

My invention has particular application as an extended conveying system for workpieces 12 as shown by the device 10 shown in FIGS. 8–9. The guide member 14 extends along the desired path of the product. It is anticipated that various workpiece operations, such as painting, inspection or the like, may be performed along the guide member 14 at any convenient location. In the extended system shown, three escapement assemblies 20 support the extended guide member 14 at spaced locations along the guide member 14. Three escapement assemblies 20 are shown for illustrative purposes only. Essentially, an escapement assembly 20 would be positioned where a guide member support is desired or where the escapement capabilities (i.e., controlled delivery) are desired, or where both are desired.

Figure 10:
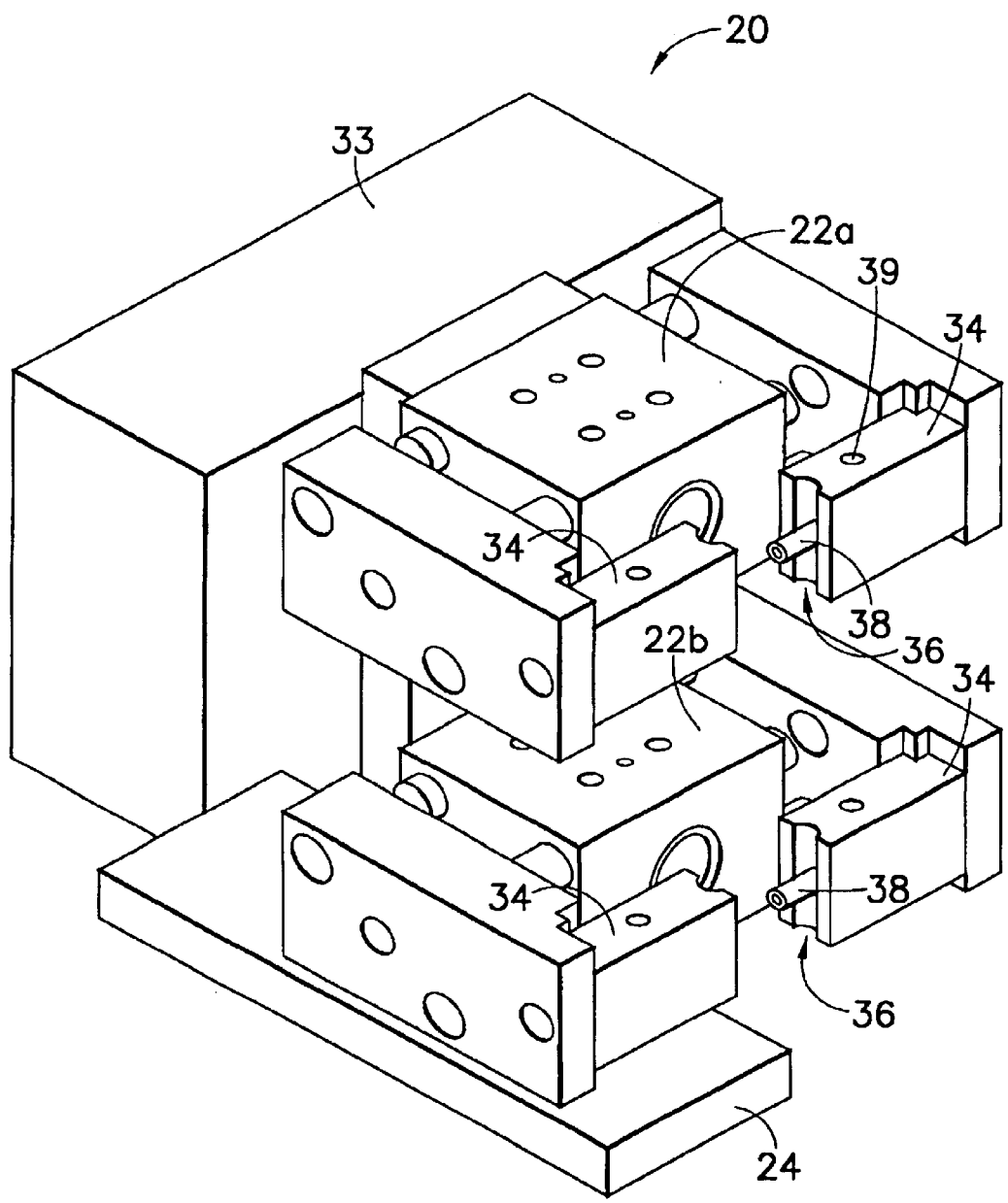
FIG. 10 is a top perspective view of a guide member engaging support having a guide pin according to my invention.

FIG. 10 shows another embodiment of the escapement assembly 20 according to my invention. The escapement assembly 20 includes two guide member engaging supports 22a and 22b which can selectively engage and support a guide member (not shown in FIG. 10) at spaced locations along the guide member. The guide member engaging supports 22a and 22b may be conventional gripper mechanisms. Suitable gripper mechanisms adapted for use in conveying operations are made by Festo or Robohand. The escapement assembly 20 includes the base 24. The guide member engaging supports 22a and 22b are controlled by a programmable logic controller (hereinafter "PLC") positioned within a control box 33. Suitable PLC's include Allen Bradley SLC 500 and GE Series 90 PLC. The guide member engaging supports 22a and 22b each include two gripping arms 34. Each of the gripping arms 34 include a recess 36 configured to engage the guide member. Positioned within each of the recesses 36 is a guide pin 38, which is exaggerated in FIG. 10 for illustration purposes. The guide pins 38 are formed to fit into apertures in the guide members 14 for added stability during the conveying operation and to prevent the axial slipping of the guide member. The guide pins 38 are contained completely within the recesses 36. The guide pin 38 is a solid rod or, alternatively, a hollow tube as shown. Each of the gripping arms 34 include a fluid supply port 39 for supplying an operating fluid to the guide member 14 through the hollow guide pins 38. This operating fluid may be utilized to advance workpieces 12 in a conveying direction. In another embodiment, a single guide pin 38 may be provided for each pair of gripping arms 34 such that the single guide pin 38 extends completely through the guide member 14.

FIG. 11 shows a front view of the escapement assembly 20 of FIG. 10 including the guide member 14 supported by guide member engaging supports 22a and 22b. The guide member 14 extends through an aperture, or the like, of a conventional workpiece 12 such as a bushing. The gripping arms 34 of the guide member engaging supports 22a and 22b have the guide pins 38 engaging apertures 40 in the guide member 14. The guide member engaging supports 22a and 22b of the escapement assembly 20 are used to isolate one or more workpieces 12 for selected transportation along the guide member 14 in a manner analogous to the escapement assembly 20 discussed above in connection with FIGS. 6A–6H. The guide pins 38 of the gripping arms 34 are configured to engage apertures 40 of the guide member 14. The guide member engaging support 22b includes a separating member 26 in the same manner as the guide member engaging supports 22b discussed previously. As shown in FIG. 12, the guide member 14 may have an aperture 40 or, alternatively, may have a reduced diameter 42 at spaced locations along the guide member 14 or any other structure which can receive guide pins 38. The guide pins 38 of the gripping arms 34 are configured to engage apertures 40 or reduced diameters 42 or the like.

FIG. 13 shows pneumatically operated gripping arms 34 in fluid communication with the guide member 14 having a plurality of air exit holes 50 for advancing workpieces 12 along the guide member 14. The gripping arms 34 each include an air inlet cavity 52 (formed by supply port 39 shown in FIG. 10) in fluid communication with the interior of the guide member 14. In this embodiment, guide pins 38 are hollow so that air from an external source (not shown) connected to the air inlet cavity 52 can pass through to the interior of the guide member 14 through apertures 40 and out of air exit holes 50 as shown by the directional arrows in FIG. 13. Air exit holes 50 are angled in the conveying direction identified by arrows C to advance workpieces 12 in the conveying direction.

Referring to FIGS. 14–17, the guide member 14 may be a powered device for assisting in the transport of the workpiece 12. FIG. 14 shows a conveyor 58 that includes frame members 60, a plurality of rollers 62 journaled to the frame members 60 and a conveyor belt 64 reeved about the rollers 62. In this embodiment, the guide pins 38 of the gripping arms 34 engage a recess 66 in each of the rollers 62. The guide pins 38 are preferably hexagonal and rotationally supported in the gripping arms 34. The rollers 62 are driven by the rotating guide pins 38 which are powered by any conventional means, such as by an electric motor (not shown). The workpiece 12 is moved in the conveying direction C by interaction between the interior surface of the workpiece 12 and the conveyor belt 64.

Figure 18:
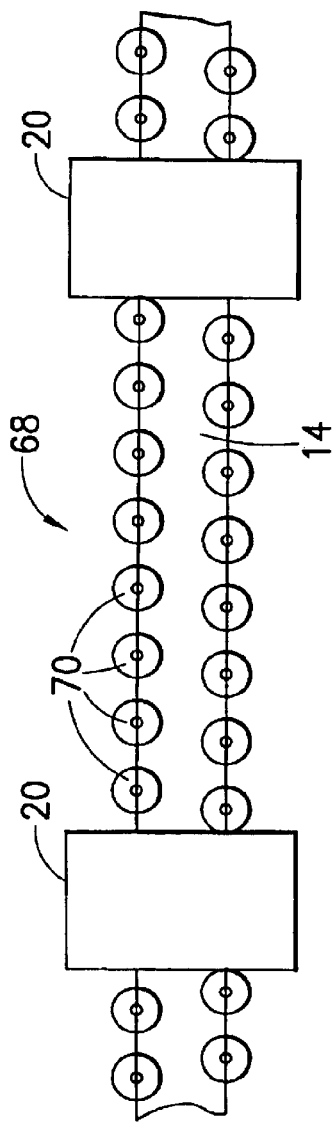
FIG. 18 is a schematic side view showing a guide member in the form of a roller conveyor.

FIG. 18 shows two escapement assemblies 20 supporting a roller conveyor 68 having a plurality of feed rollers 70. The roller conveyor 68 is similar to the conveyor shown in FIG. 14 with the exception that the conveyor belt 64 has been replaced by feed rollers 70. The roller conveyor 68 may be powered in a similar manner to the conveyor 58 shown in FIG. 14 or may be non-powered.

Figure 19:
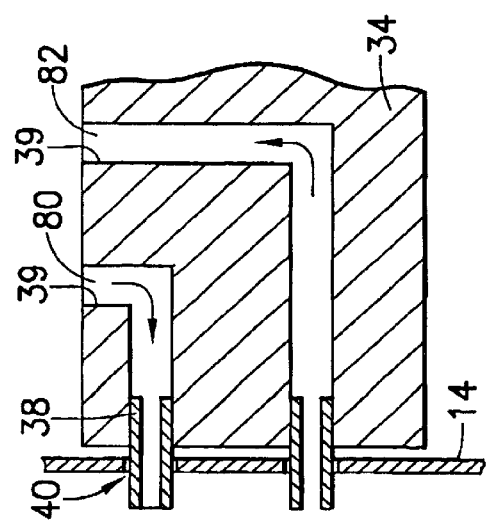
FIG. 19 is a schematic sectional view of a hydraulically operated embodiment of the guide member engaging support shown in FIG. 11 in fluid communication with a guide member according to my invention.

FIG. 19 shows a hydraulically operated gripping arm 34 in fluid communication with the guide member 14. The gripping arm 34 includes a supply conduit 80 and a return conduit 82. The supply conduit 80 and the return conduit 82 are each in fluid communication with a hydraulic fluid source through fluid supply port 39 and the interior of the guide member 14. The hydraulic fluid may be utilized to advance workpieces 12. The guide pins 38 of the gripping arm 34 are hollow in a similar manner to the pneumatically operated embodiment discussed hereinabove in connection with FIG. 13. The hydraulic fluid circulating through the interior of the guide member 14 provides an effective means for regulating the temperature of workpieces (not shown) carried by the guide member 14. The hydraulic fluid can supply heat to the workpiece 12 or operate as a heat sink. The hydraulic fluid can be used in any desired fashion. The present invention shown in FIG. 19 relates to the method of delivering hydraulic fluid to the guide member 14.

Figure 20:
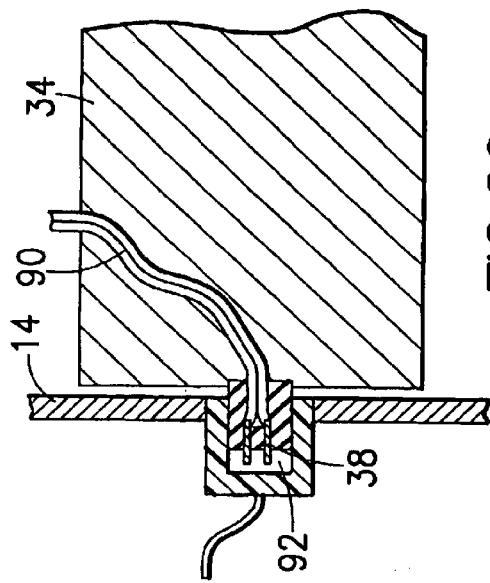
FIG. 20 is a schematic sectional view showing an electrically powered embodiment of a guide member engaging support according to my invention in electrical contact with a guide member according to my invention.

FIG. 20 shows an electrically operated gripping arm 34 of the escapement assembly 20. In this embodiment, the guide pin 38 of the gripping arm 34 includes an electrically conductive member adapted to engage the guide member 14. The guide pin 38 is electrically connected by lead 90 to an electrical source (not shown). The guide member 14 includes an electrical socket 92. The guide pin 38 of the gripping arm 34 when in contact with guide member 14, provides electrical power to the guide member 14 which, in this embodiment, can be used to power an electric motor driving the conveyor shown in FIG. 14. The electric power supplied to the guide member 14 may be used for any purpose. FIG. 20 is merely intended to illustrate the method of delivering power to the guide member 14.

Figure 21:
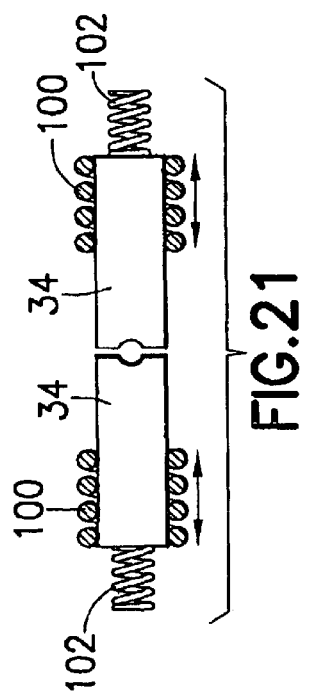
FIG. 21 is a schematic sectional view showing an electromagnetical gripping arm of a guide member engaging support according to my invention.

FIG. 21 shows an electromagnetic embodiment of the gripping arm 34 of the escapement assembly 20. FIG. 21 shows gripping arms 34 each having coils 100 located around the gripping arms 34. The coils 100 are connected to an external power source (not shown). The coils 100 are operated in a sequential manner to open and close the gripping arms 34 to place the gripping arms 34 into engagement with the guide member (not shown). Springs 102 are provided to bias the gripping arms 34 to the closed or engaged position around the guide member to provide a starting and fail safe position in the event of power failure to the coils 100.

Figure 22:
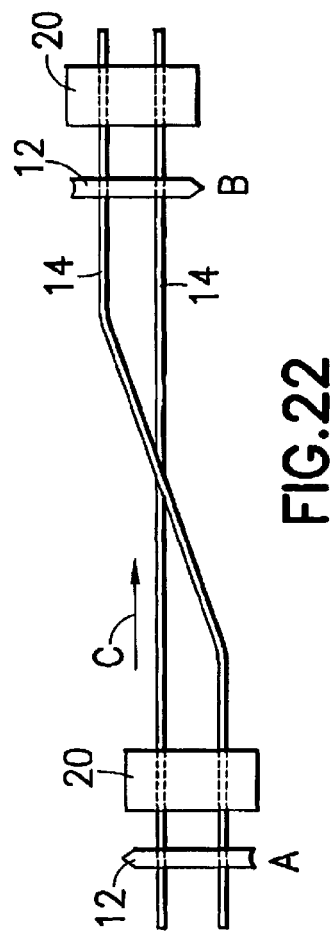
FIG. 22 is a schematic view showing a guide member engaging support engaging two substantially parallel guide members.
Figure 23:
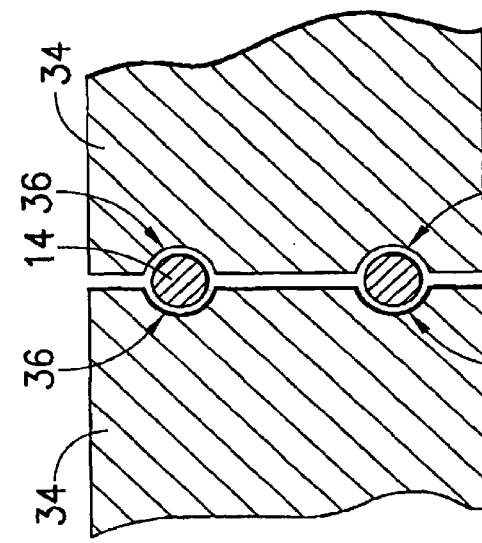
FIG. 23 is a schematic sectional view of the guide member engaging support of FIG. 22.

FIGS. 22 and 23 show a pair of escapement assemblies 20 supporting two substantially parallel guide members 14. The workpiece 12 is supported on each of the guide members 14 through separate apertures or the like in the workpiece 12. The escapement assemblies 20 are shown having each pair of guide members 14 received between two cooperating recesses 36. As can be seen in FIG. 22, the guide members 14 can be used to change the orientation of workpiece 12 by 180° from position "A" to position "B". Each of the guide members 14 are simultaneously engaged by the gripping arms 34 of the escapement assemblies 20 so that at least one of the escapement assemblies 20 is in contact with the guide members 14 at any given time. The figures show the pair of guide members 14 simultaneously engaged by the gripping arms 34, however, each guide member 14 could be supported by independent escapement assemblies 20.

Figure 24:
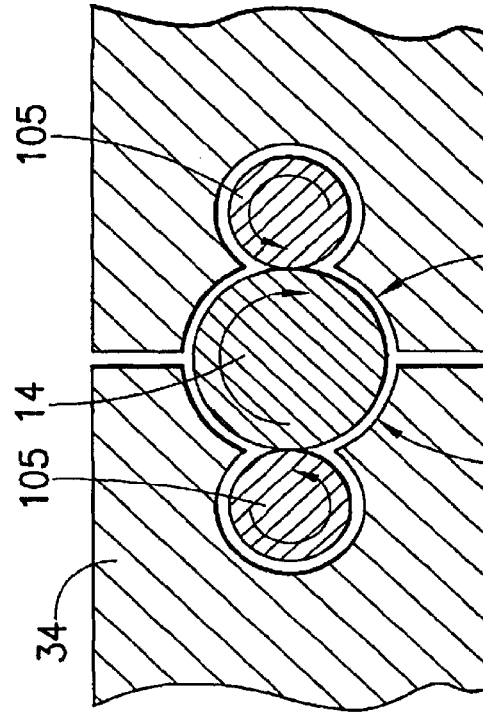
FIG. 24 is a schematic sectional view showing two engaged gripping arms of a guide member engaging support having a drive wheel.

FIG. 24 shows another embodiment of the escapement assembly 20. In this embodiment, the guide pins 38 of the gripping arms 34 have been replaced by rotatable drive wheels 105. The guide member 14 is positioned within cooperative recesses 36 of the gripping arms 34. The guide member 14 in this embodiment is in the form of a solid rod which is rotated by frictional interaction with the drive wheels 105. Workpieces (not shown) received around the guide member 14 may therefore be rotated on the guide member 14 as the workpieces progress along the conveying path.

FIG. 25 shows a typical pneumatic or hydraulic circuit for operation of escapement assemblies 20. Each escapement assembly 20 includes a supply fluid line 110 for supplying an operating fluid to guide member engaging supports 22a and 22b and a return fluid line 112 for returning the operating fluid to a fluid source (not shown). A control valve 114, such as a hydraulic valve, is provided in the supply fluid lines 110 and return fluid lines 112 to control the supply and return of operating fluids from guide member engaging supports 22a and 22b. Proximity switches 116 are provided on each guide member engaging support 22a and 22b to indicate the open and closed position of guide member engaging supports 22a and 22b. Proximity switches 116 may be connected to a PLC and used to control the operation of control valves 114.

Figure 26:
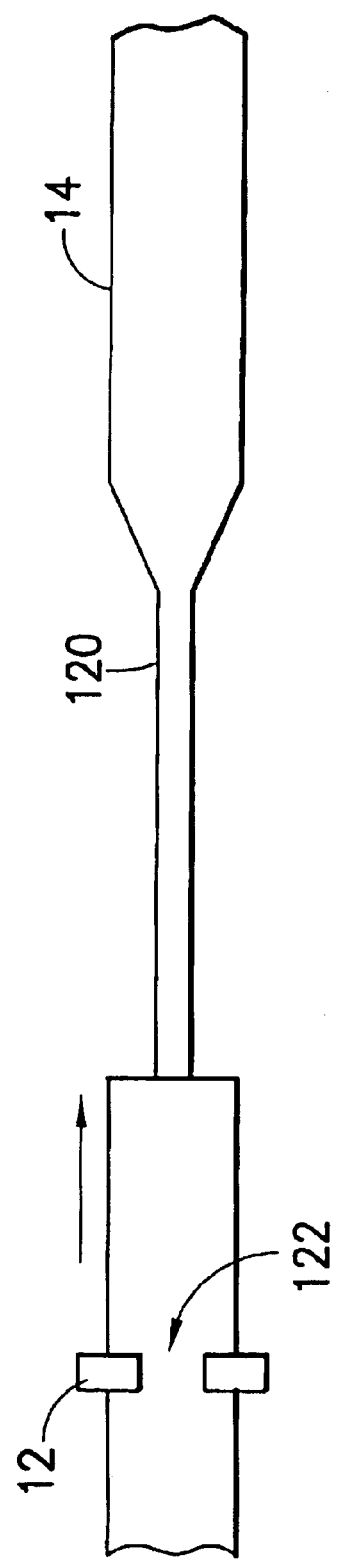
FIG. 26 is a plan view of a guide member having a reduced diameter portion.

In general, the hereinabove discussed guide members 14 have a uniform cross-section substantially corresponding to a shape of the aperture of the article or workpiece being conveyed. However, referring to FIG. 26, the guide member 14 can have a non-uniform cross-section. Guide member 14 in FIG. 26 includes a reduced diameter portion 120. The reduced diameter portion 120 may be utilized to sort workpieces having a noncontinuous outer circumference such as workpiece 12 shown in FIG. 26. Workpiece 12 includes a gap or opening 122 communicating with the aperture in workpiece 12. As workpiece 12 moves in the conveying direction C it will encounter reduced diameter portion 120. If gap 122 is large enough, workpiece 12 will drop off the guide member 14. If gap 122 is sized small enough, workpiece 12 will continue to progress in the conveying direction C. In this manner, workpieces of varying sizes and configurations can be segregated, sized and/or tested.

The above constructions of the article transporting and escapement device 10 are merely illustrative of the present invention and not restrictive thereof. The workpiece 12 conveyed may be quite large, such as tires. In this situation, the use of a powered device such as a conveyor belt 64 (FIG. 14) as the guide member 14 would be advantageous. The power supply for a powered guide member may be included within the guide member itself, such as a battery pack. However, it may be more effective if the power supply to the powered guide member, as discussed hereinabove, is through the escapement assembly. This may be through mechanical connection, electrical connection, hydraulic connection, or pneumatic connection.

The article transporting and escapement device of my invention provides a device for metering and transporting apertured articles or the like which will support and/or guide the articles from the interior thereof for transportation along a conveying path. This allows the exterior of the workpiece to be completely accessible eliminating the need for intermediate feeding or handling devices. My invention is a flexible, cost-effective and efficient design which can be adapted to a wide variety of industrial applications.

It will be appreciated by those of ordinary skill in the art that various modifications may be made to the present invention without departing from the spirit and scope thereof. The scope of the present invention is not limited to the specific embodiments disclosed herein which are for illustrative purposes only, but should be defined by the appended claims and equivalents thereto.

I claim:

1. An article transporting and escapement device, comprising:
    a guide member extending along a conveying path of an article wherein said guide member is adapted to be received through an aperture of the article; and
    at least one escapement assembly comprising at least two guide member supports for selectively engaging said guide member at spaced locations along said guide member, at least one of said supports being engaged with said guide member at any given time, wherein at least a portion of said guide member is mechanically driven by said guide member support.

2. The article transporting and escapement device as defined in claim 1, wherein said guide member supports isolate one or more articles for selective transportation along said guide member.

3. The article transporting and escapement device as defined in claim 2, wherein said escapement assembly includes a first guide member support and a second guide member support operating in a cycle such that when said first guide member support engages said guide member, a leading article contacts said first guide member support, and when said second guide member support engages said guide member, said first guide member support disengages said guide member thereby releasing the leading article for transport along the conveying path.

4. The article transporting and escapement device as defined in claim 3, wherein when said second guide member support engages said guide member, a trailing article contacts said second guide member support.

5. The article transporting and escapement device as defined in claim 4, wherein said second guide member support includes a separating member for engaging the articles upstream of said second guide member support.

6. The article transporting and escapement device as defined in claim 1, wherein each of said guide member supports include a pair of gripping arms simultaneously engaging opposite sides of said guide member.

7. The article transporting and escapement device as defined in claim 1, wherein said guide member supports are pneumatically driven.

8. The article transporting and escapement device as defined in claim 1, wherein said guide member supports each include a pair of electromechanically operated gripping arms simultaneously engaging said guide member, said gripping arms spring biased into engagement with said guide member.

9. The article transporting and escapement device as defined in claim 1, wherein said guide member includes a conveyor for transporting articles in a conveying path.

10. A article transporting and escapement device, comprising:
   a guide member extending along a conveying path of an article wherein said guide member is adapted to be received through an aperture of the article; and
   at least one escapement assembly comprising at least two guide member supports for selectively engaging said guide member at spaced locations along said guide member, at least one of said supports being engaged with said guide member at any given time, wherein each of said guide member supports include a pair of gripping arms simultaneously engaging opposite sides of said guide member, and wherein said guide member includes at least one recess and at least one of said gripping arms of each said pair of gripping arms includes a guide pin adapted to engage said at least one recess in said guide member.

11. A article transporting and escapement device, comprising:
   a guide member extending along a conveying path of an article wherein said guide member is adapted to be received through an aperture of the article and said guide member is a hollow rod; and
   at least one escapement assembly comprising at least two guide member supports for selectively engaging said guide member at spaced locations along said guide member, at least one of said supports being engaged with said guide member at any given time, wherein each of said guide member supports includes a pair of gripping arms simultaneously engaging opposite sides of said guide member.

12. The article transporting and escapement device as defined in claim 11, wherein said guide member supports are in fluid communication with said hollow guide member.

13. A article transporting and escapement device, comprising:
   a guide member extending along a conveying path of an article wherein said guide member is adapted to be received through an aperture of the article; and
   at least one escapement assembly comprising at least two guide member supports for selectively engaging said guide member at spaced locations along said guide member, at least one of said supports being engaged with said guide member at any given time, and wherein said guide member is electrically connected to said guide member support when said support engages said guide member providing an electrical power supply to said guide member when said support engages said guide member.

14. The article transporting and escapement device as defined in claim 13, wherein at least a portion of said guide member is mechanically driven by said guide member support.

15. A article transporting and escapement device comprising:
   at least two substantially parallel guide members extending along a conveying path of an article wherein each said guide member is adapted to be received through an aperture of the article; and
   at least one escapement assembly comprising at least two guide member supports for selectively engaging said guide members at spaced locations along said guide members, at least one of said supports being engaged with each said guide member at any given time, wherein each of said guide member supports includes a pair of gripping arms simultaneously engaging opposite sides of said guide members.

16. An escapement assembly for use in a device for transporting articles having apertures defined therethrough along a guide member over an extended length, wherein the guide member is received through at least one of the apertures of the article, comprising:
   at least three guide member supports for selectively engaging the guide member at spaced locations along said extended length of guide member, at least one of said supports being engaged with and supporting the guide member at any given time.

17. The escapement assembly as defined in claim 16, wherein said guide member supports isolate one or more articles for selective transportation along said guide member.

18. The escapement assembly as defined in claim 17, wherein said escapement assembly includes a first guide member support and a second guide member support operating in a cycle such that when said first guide member support engages said guide member, a leading article contacts said first guide member support, and when said second guide member support engages said guide member, said first guide member support disengages said guide member thereby releasing the leading article for transport along the conveying path.

19. The escapement assembly as defined in claim 18, wherein when said second guide member support engages said guide member, a trailing article contacts said second guide member support.

20. The escapement assembly as defined in claim 19, wherein said second guide member support includes a separating member for engaging the articles upstream of said second guide member support.

21. The escapement assembly as defined in claim 16, wherein each of said guide member supports include a pair of gripping arms simultaneously engaging opposite sides of the guide member.

22. The escapement assembly as defined in claim 16, wherein said guide member supports are pneumatically driven.

23. The escapement assembly as defined in claim 16, wherein the guide member is electrically connected to said guide member support when said support engages said guide member to provide a power source to said guide member support.

24. The escapement assembly as defined in claim 16, wherein said guide member supports each include a pair of electromagnetically operated gripping arms simultaneously engaging said guide member, said gripping arms spring biased into engagement with said guide member.

25. The escapement assembly as defined in claim 16, wherein said supports of said escapement assembly engage at least two substantially parallel guide members.

26. An escapement assembly for use in a device for transporting articles having apertures defined therethrough along a guide member received through at least one of the apertures, comprising:
   at least two guide member supports for selectively engaging the guide member at spaced locations along said guide member, at least one of said supports being engaged with and supporting the guide member at any given time, wherein each of said guide member supports includes a pair of gripping arms simultaneously engaging opposite sides of the guide member, and wherein each said guide member support includes at least one linear actuator for moving said gripping arms of each said pair of gripping arms along a linear path to engage said guide member.

27. An escapement assembly for use in a device for transporting articles having apertures defined therethrough along a guide member received through at least one of the apertures, comprising:
   at least two guide member supports for selectively engaging the guide member at spaced locations along said guide member, at least one of said supports being engaged with and supporting the guide member at any given time, wherein each of said guide member supports includes an actuator and a pair of modular gripping arms simultaneously engaging opposite sides of the guide member, and wherein each of said modular gripping arms is independently, removably attached to said guide member support and wherein said gripping arms include a matching recess on a front face thereof which is sized to specifically engage said guide member.

28. The escapement assembly as defined in claim 27, wherein said guide member is hollow and said guide member supports are in fluid communication with said hollow guide member.

29. An escapement assembly for use in a device for transporting articles having apertures defined therethrough along a guide member received through at least one of the apertures, comprising:
   at least two guide member supports for selectively engaging the guide member at spaced locations along said guide member, at least one of said supports being engaged with and supporting the guide member at any given time, and wherein at least a portion of said guide member is mechanically driven by said guide member support.

30. An article transporting device for articles having at least one aperture therethrough, comprising:
   at least one guide member extending along a conveying path and extending through the aperture of each article, wherein a change in the orientation of said guide member rotationally orientates the article about an axis parallel to said guide member in a desired position along the conveying path.

31. An article transporting device for articles having at least one aperture therethrough, comprising:
   at least two guide members extending along a conveying path and each extending through an aperture of each article, wherein a change in the orientation of said guide member orientates the article in a desired position along the conveying path, wherein said at least two guide members are substantially parallel and extend along the conveying path and extend through selected apertures of each article, said guide members being positionable with respect to the other so as to orientate the article in a desired position along the conveying path.

32. A method of conveying a workpiece along a conveying path comprising the steps of:
   a) positioning a workpiece on at least one internal guide member, wherein the guide member is received within an aperture of the workpiece;
   b) conveying the workpiece along the guide member along the conveying path;
   c) selectively engaging the guide member at spaced locations along the conveying path by at least three guide member supports, wherein at least one guide member support is engaging and supporting the guide member at any given time.

33. The method of claim 32, wherein the workpiece is conveyed past each of the guide member supports along the conveying path.

34. The method of claim 32, wherein the workpiece is rotationally oriented by the internal guide member about an axis parallel to the conveying path.

35. An article transporting and escapement device, comprising:
   a guide member extending along a conveying path of an article wherein said guide member is adapted to be received through an aperture of the article;
   at least one escapement assembly comprising at least two guide member supports for selectively engaging said guide member at spaced locations along said guide member, at least one of said supports being engaged with said guide member at any given time; and
   a separating member attached to and extending from one said guide member support, said separating member engaging articles on said guide member upstream of said guide member supports.

36. An article transporting and escapement device, comprising:
   a guide member extending along an extended curved conveying path of an article wherein said guide member is adapted to be received through an aperture of the article and is curved along its length to follow the extended curved conveying path to deposit articles at the point of use; and at least one escapement assembly comprising at least two guide member supports for selectively engaging and supporting said guide member at spaced locations along said guide member, at least one of said supports being engaged with said guide member at any given time.

37. An article transporting and escapement device, comprising:

a guide member extending along a conveying path of an article wherein said guide member is adapted to be received through an aperture of the article;

at least one escapement assembly comprising at least two guide member supports for selectively engaging said guide member at spaced locations along said guide member, at least one of said supports being engaged with said guide member at any given time; and a non-gravity article transporting means for moving the articles along said guide member.

38. The article transporting and escapement device of claim 37 wherein said article transporting means includes a driven conveying system incorporated into the guide member.

39. The article transporting and escapement device of claim 37 wherein said article transporting means includes a hollow guide member, wherein a medium for advancing the articles is carried within the hollow guide member.

40. A method of conveying a series of workpieces along a conveying path and delivering a series of workpieces to a desired location with an escapement assembly comprising the steps of:

a) positioning a series of workpieces on at least one internal guide member, wherein the guide member is received within an aperture of each workpiece;

b) conveying each workpiece along the guide member along the conveying path;

c) selectively engaging the guide member at spaced locations along the conveying path by at least two guide member supports, wherein at least one guide member support is engaging and supporting the guide member at any given time; and d) releasing a plurality of said workpieces at one time from said guide member at a desired location, whereby said guide member and said guide supports form an escapement assembly for delivering a series of workpieces.

* * * * *